United States Patent Office 3,210,709
Patented Oct. 5, 1965

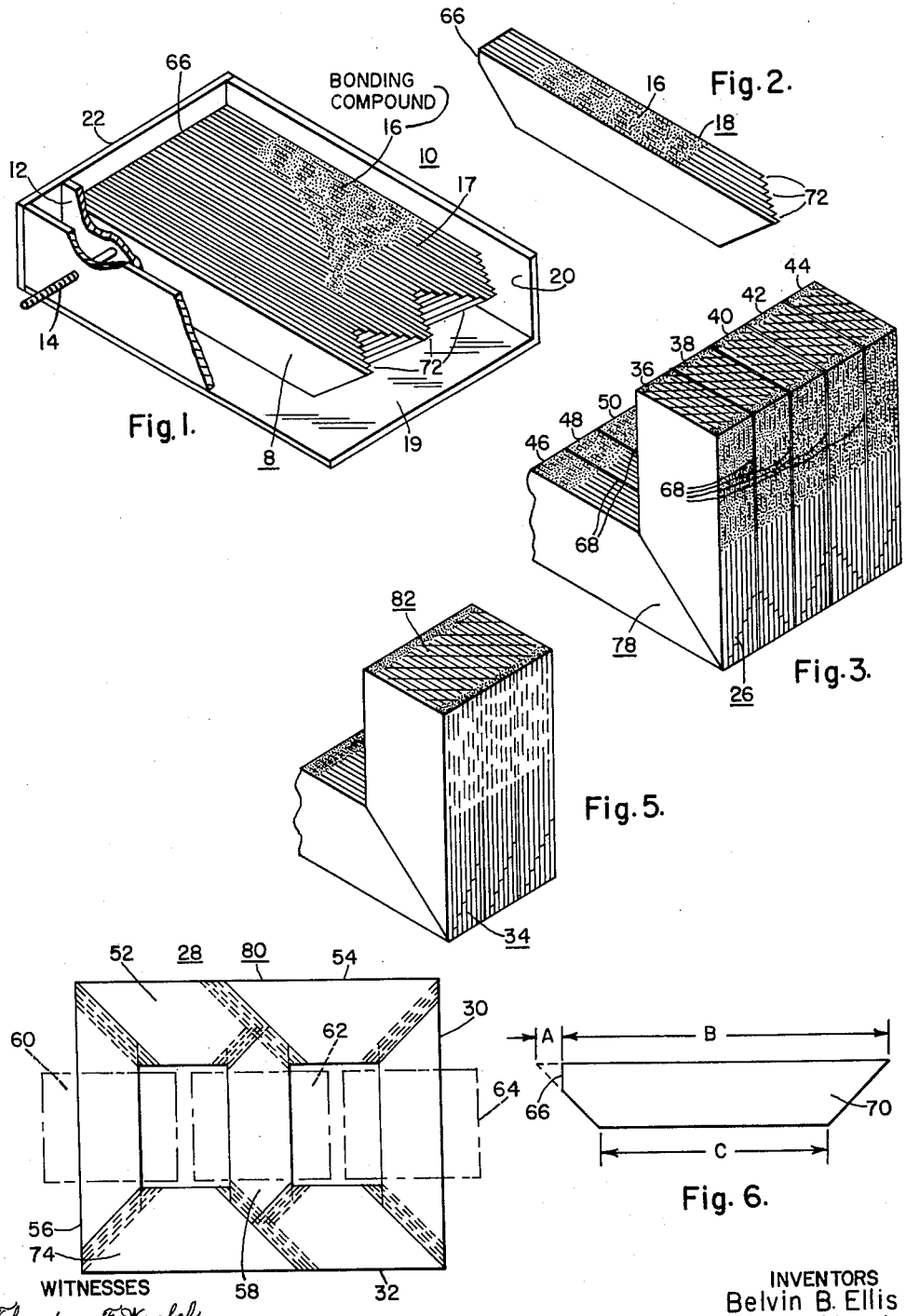

3,210,709
MAGNETIC CORE STRUCTURE FOR ELECTRICAL INDUCTIVE APPARATUS AND METHOD OF CONSTRUCTING SAME
Belvin B. Ellis, Shenango Township, Mercer County, and Charles E. Burkhardt, Sharon, Pa., assignors to Westinghouse Electric Corporation, Pittsburgh, Pa., a corporation of Pennsylvania
Filed Jan. 16, 1963, Ser. No. 251,886
6 Claims. (Cl. 336—217)

This invention relates in general to laminated magnetic cores, and more particularly to the assembly of a novel laminated magnetic core.

Laminated magnetic cores of the prior art have conventionally employed bolts or clamps to hold groups of individual laminations together during the assembly of the core and to prevent shifting of individual laminations in the completed core. These methods have disadvantages because bolt holes in the laminations produce a magnetic flux crowding around the bolt holes and also a burr build-up problem. Clamps are bulky and add to the complexity of the core assembly process. It is desirable to simplify the assembly of stacked magnetic cores by fastening the individual laminations into groups.

Accordingly, it is a general object of this invention to provide a new and improved method for holding laminated magnetic core groups together during assembly.

It is another object of this invention to provide a laminated magnetic core in which the laminations are bonded into groups.

It is a more particular object of this invention to provide a new and improved method of preventing laminated magnetic core section from shifting during assembly without the use of clamps or bolts.

Briefly, the present invention accomplishes the above-cited objects by providing an edge bond of a thermosetting plastic or resinous material to a stacked or temporarily clamped section of laminated magnetic core material. Thermosetting epoxy resins and other thermosetting resins have been satisfactory for such edge bonding of the laminations. The edge bond is allowed to cure and then any temporary clamps are removed. The laminated magnetic core sections may then be separated into groups by slitting between laminations at the desired intervals with a knife or other sharp instrument. The individual laminations of the laminated magnetic core groups or section are thus solidly bound together before assembly into the complete magnetic structure.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIGURE 1 is a perspective view with parts broken away of an assembly fixture containing laminations;

FIG. 2 is a perspective view of a magnetic core section comprising several of the laminations shown in FIG. 1;

FIG. 3 is a partial perspective view of a magnetic core employing step-lap joints;

FIG. 4 is an elevation of a three phase transformer illustrating one way the lamination sections may be joined into a complete magnetic core;

FIG. 5 is a partial perspective view of a laminated magnetic core employing step-lap joints which are stepped in but one direction; and FIG. 6 is a side elevation of one of the laminations of FIGS. 1 and 2.

In FIG. 1 there is illustrated an assembly fixture or box 10 which may be used for bonding a lamination stack. A plurality of laminations 8 are placed in a box 10. It is advantageous to tip the box 10 so that ends 66 of the laminations will slide up to the end 22 of the box under the influence of gravity. The laminations may be prevented from tipping sideways by inclining the box 10 toward side 20. It will be observed that the ends 72 of the laminations 8 are arranged in a regular stepped pattern as is explained with reference to FIG. 6 of the drawings. A movable partition 12 may be tightened against the laminations 8 by the use of screw means 14. While the laminations 8 are thus under compression, a thermosetting bonding compound 16 is applied to the exposed edges 17 of the laminations 8. A thermosetting bonding compound is a plastic or fusible compound which becomes permanently rigid upon the application of heat. Magnetic cores are often operated at elevated temperatures. Therefore, it is important that the bonding compound not soften when thermally cycled in normal core operation. The individual laminations 8 are prevented by the thermosetting bonding compound 16 from shifting due to the mechanical forces which stress a magnetic core when the core is subjected to alternating magnetic flux. If additional bonding strength is required, after the thermosetting bonding compound 16 has cured, the laminations 8 may be turned upside down and thermosetting bonding compound may be applied to the edges of the laminations 8 which were formerly in contact with surface 19. To facilitate the separation of the bonded laminations into groups we have found it desirable to place thin spacers such as plastic sheets 68 or any other material to which bonding compound 16 will not adhere, as shown in FIG. 3, at intervals in the lamination stack. The cured lamination stack may then be easily separated at these intervals. The spacers 68 of FIG. 3 need not be removed after separation of the lamination stack as their presence in a completed magnetic core is not detrimental.

We have found that thermosetting resins, such as most epoxy resins, are suitable bonding compounds. With certain thermosetting epoxy resins, the curing of the resin compound may be done at room temperature or the curing time may be shortened by curing at elevated temperatures. The compression of the lamination stack should not be so great as to prevent penetration of the bonding compound 16 an inch or two below the exposed edges 17 of the lamination stack on which the bonding compound 16 is applied. The illustrated laminations 8 are shaped for the outer leg groups 30 or 56 of the core shown at FIG. 4 but the teachings of the invention may also be applied to yoke groups 52, 54, 74 and 32 or to inner leg groups 58 of the core shown at FIG. 4.

Referring to FIG. 2 of the drawings, there is illustrated an adherent group or section of laminations 18 which have been severed from the larger group of laminations 8 shown in FIG. 1 after the thermosetting bonding compound 16 has cured and the compressive force on the laminations has been released. The size of lamination group 18 may be so chosen as to obtain a unit of a size that is convenient to assemble into a complete magnetic core such as the core illustrtaed by FIG. 4 of the drawing. It is to be noted that the bonding compound 16 is kept away from the ends 66 and 72 of the laminations so as not to interfere with good metal to metal joints in the assembled core.

Referring to FIG. 3 of the invention, there is illustrated a partial perspective view of a magnetic core 78 employing a plurality of bonded leg sections 36, 38, 40, 42 and 44 and a plurality of bonded yoke sections of groups such as 46, 48 and 50, separated by plastic spacers 68, preassembled and edge bonded together in accordance with the teachings of our invention. A double-step type joint 26 is used between the leg and yoke sections of core 78 to prevent magnetic flux crowding and give lower losses than a butt type of joint. We have found our invention well suited for step-lap jointed cores because the steps aid in the alignment of the bonded core sections or groups during assembly of the core 78. By the term step-lap jointed we mean the joining of core sections or groups in such a way that successive laminations are incrementally stepped on the ends in at least one direction. Our invention may also be used with other types of magnetic core joints. It will be understood that any convenient number of repeated stepped end patterns may be included in any adherent lamination section or groups.

Referring to FIG. 4 of the invention, there is illustrated a three phase transformer 28 including a laminated magnetic core 80 comprising a plurality of adherent yoke lamination groups 52, 54, 74 and 32 joined to a plurality of adherent leg lamination groups 56, 58 and 30. It will be understood that each leg or yoke of core 80 is constructed of one or more pre-bonded lamination groups or sections. The transformer windings 60, 62 and 64 are shown in phantom outline.

In FIG. 5 of the drawings, there is illustrated a partial perspective view of a transformer core 82 similar to the transformer core illustated in FIG. 3 with the exception that the joints such as joint 34 are stepped in but one direction.

There is illustrated in FIG. 6 of the drawings one of the laminations 70 used in FIGS. 1 and 2. The end 66 of lamination 70 is the end which contacts wall 22 of the assembly fixture 10 of FIG. 1. The lamination 70 is cut from a blank having a longest dimension of $A+B$ and a next to longest dimension C. In successive laminations, the longest dimension B is incrementally varied between $A+B$ and B in a regular sequence by varying the length A cut from the lamination blanks to produce a plurality of laminations which vary in longest dimension in steps from B to $A+B$. When the laminations so cut are placed with their ends 66 in contact with a flat surface, a lamination group with both ends stepped is obtained as best seen in FIGS. 1 and 2.

It will be understood that while the lamination 70 illustrated is an outside leg lamination such as used in leg groups 56 and 30 of FIG. 4 of the drawings, the principle of stepping lamination ends by incremental clipping of one end of the laminations may also be applied to yoke groups such as yoke lamination groups 52, 54, 74 and 32 of FIG. 4 of the drawing.

It will, therefore, be apparent that there has been disclosed a method of preassemblying magnetic laminations by means of edge bonding which permits rapid assembly of completed magnetic cores.

While there has been shown and described what are at present considered to be the preferred embodiments of the invention, modifications thereto will readily occur to those skilled in the art. It is not desired, therefore, that the invention be limited to the specific arrangements shown and described and we intend to cover all such modifications as fall within the true spirit and scope of the invention.

We claim as our invention:

1. The method of assemblying a step-lap jointed transformer core comprising cutting a plurality of laminations from ferromagnetic material so that the ends of successive laminations form a step-lap pattern, placing the laminations in an adjacent relationship, compressing the laminations, applying a thermosetting bonding compound to adjacent edges of said laminations, curing the thermosetting bonding compound, separating the laminations into sections comprising at least three laminations, and then joining the lamination sections into a step-lap jointed transformer core.

2. The method of assembling a step-lap jointed transformer core comprising cutting a plurality of laminations from ferromagnetic material, with the ends of successive laminations forming a step-lap pattern, placing the laminations in a stacked adjacent relationship with spacing members placed at intervals between laminations, applying a thermosetting bonding compound to adjacent edges of said laminations, curing the thermosetting bonding compound, separating the laminations into sections at said spacing members, and then joining the lamination sections into a transformer core.

3. A magnetic core comprising a plurality of leg and yoke members each formed from a plurality of stacked laminations having ends cut in a predetermined manner; said leg members being disposed in spaced parallel relation; said yoke members being disposed to join the ends of said spaced leg members, with the ends of the laminations in said yoke members being aligned with the ends of the laminations in said leg members to form a substantially rectangular magnetic core structure having four outer corners and outer sides extending between the outer corners formed by the edges of the stacked laminations; the stacked laminations in each of said leg and yoke members being divided into groups; bonding means disposed on at least the edges of each of said groups which form the outer sides of said magnetic core structure; said bonding means starting a predetermined distance from one end of each leg and yoke member and ending a predetermined distance from the other end of each leg and yoke member; said bonding means holding the laminations of each group in assembled relation.

4. A magnetic core comprising a plurality of leg and yoke members each formed from a plurality of stacked laminations having ends cut diagonally with respect to the sides of said laminations and offset from one another in a predetermined pattern; said leg members being disposed in spaced parallel relation; said yoke members being disposed to join the ends of said spaced leg members, with the diagonally cut ends of the laminations in said yoke members being aligned with the diagonally cut ends of the laminations in said leg members to form a substantially rectangular magnetic core structure having four outer corners, outer sides extending between the outer corners formed by the edges of the stacked laminations, and joints which are offset from the corresponding joints in the adjacent laminations; the stacked laminations in each of said leg and yoke members being divided into groups; bonding means disposed on at least the edges of each of said groups which form the outer sides of said magnetic core structure; said bonding means starting a predetermined distance from one end of each leg and yoke member and ending a predetermined distance from the other end of each leg and yoke member; said bonding means holding the laminations of each group in assembled relation.

5. A magnetic core comprising a plurality of leg and yoke members each formed from a plurality of stacked laminations having ends cut diagonally with respect to the sides of said laminations; said leg members being disposed in spaced parallel relation; said yoke members being disposed to join the ends of said spaced leg members, with the diagonally cut ends of the laminations in said yoke members being aligned with the diagonally cut ends of the laminations in said leg members to form a substantially rectangular magnetic core structure having four outer corners and outer sides extending between the outer corners formed by the edges of the stacked laminations; the stacked laminations in each of said leg and yoke members being divided into groups of at least three laminations, with the ends of the laminations in each group being offset from one another in a predetermined stepped pattern having at least three steps in one direction before the pattern is repeated; bonding means disposed on at least the edges of each of said groups which form the outer sides of said magnetic core structure; said bonding means starting a predetermined distance from one end of each leg and yoke member and ending a predetermined distance from the other end of each leg and yoke member; said bonding means holding the laminations of each group in assembled relation.

6. A magnetic core comprising a plurality of yoke members and at least 3 leg members each formed from a plurality of stacked laminations having ends cut diagonally with respect to the sides of said laminations and offset from one another in a predetermined stepped pattern; said leg members being disposed in spaced parallel relation to form two outer leg members and an inner leg member; said yoke members being disposed to join the ends of said spaced leg members, with the diagonally cut ends of the laminations in said yoke members being aligned with the diagonally cut ends of the laminations in said leg members to form a substantially rectangular core structure having four outer corners, outer sides extending between the outer corners formed by the edges of the stacked laminations, two substantially rectangular windows, and joints between adjoining laminations which are offset from the corresponding joints in the adjacent laminations; the stacked laminations in each of said leg and yoke members being divided into groups; bonding means disposed on at least the edges of each of said groups which form the outer sides of said magnetic core structure and at least the edges on one side of said inner leg member; said bonding means starting a predetermined distance from one end of each leg and yoke member and ending a predetermined distance from the other end of each leg and yoke member; said bonding means holding the laminations of each group in assembled relation.

References Cited by the Examiner

UNITED STATES PATENTS

| | | | |
|---|---|---|---|
| 2,393,038 | 1/46 | Forbes | 336—217 |
| 2,508,128 | 5/50 | Waards | 156—254 |
| 2,579,560 | 12/51 | Ford | 29—155.61 X |
| 2,628,273 | 2/53 | Somerville | 336—217 |
| 2,732,324 | 1/56 | Morris | 156—254 |
| 2,960,756 | 11/60 | Treanor | 336—211 X |
| 2,978,371 | 4/61 | Baciu | 161—186 X |
| 2,980,572 | 4/61 | Bagdon et al. | 156—305 X |

KATHLEEN H. CLAFFY, *Primary Examiner.*

JOHN F. BURNS, LARAMIE E. ASKIN,
*Examiners.*